United States Patent [19]

Tsurumiya et al.

[11] Patent Number: 5,202,830
[45] Date of Patent: Apr. 13, 1993

[54] MOTOR DRIVE CONTROL CIRCUIT

[75] Inventors: Osamu Tsurumiya; Masataka Izawa, both of Wako, Japan

[73] Assignee: Honda Giken Kogyo Kabushiki Kaisha, Tokyo, Japan

[21] Appl. No.: 498,209

[22] Filed: Mar. 22, 1990

[30] Foreign Application Priority Data

Mar. 22, 1989 [JP] Japan .................................. 1-070038

[51] Int. Cl.⁵ .............................................. B62D 5/04
[52] U.S. Cl. ................................. 364/424.05; 180/79.1
[58] Field of Search .................. 364/424.05, 131, 133; 180/79.1, 141, 142, 143

[56] References Cited

U.S. PATENT DOCUMENTS

| | | | |
|---|---|---|---|
| 4,621,327 | 11/1986 | Dolph et al. | 364/424 |
| 4,652,002 | 3/1987 | Kurokawa et al. | 364/424.05 |
| 4,719,396 | 1/1988 | Shimizu | 318/432 |
| 4,736,810 | 4/1988 | Morishita et al. | 180/79.1 |
| 4,799,566 | 1/1989 | Shimizu | 180/79.1 |
| 4,819,170 | 4/1989 | Shimizu | 180/79.1 |
| 4,913,249 | 4/1990 | Lang | 180/79.1 |
| 4,939,653 | 7/1990 | Tsurumiya et al. | 364/424.05 |
| 4,959,787 | 9/1990 | Morishita et al. | 364/424.05 |

Primary Examiner—Thomas G. Black
Assistant Examiner—Collin W. Park
Attorney, Agent, or Firm—Irving M. Weiner; Joseph P. Carrier; Pamela S. Burt

[57] ABSTRACT

A PWM motor drive control circuit for an electric power steering system, comprising: a bridge circuit having four arms each defined by a transistor; a main control unit for producing a continual direction control signal and a torque control signal of a variable duty ratio to activate the electric motor in a desired direction at a desired torque according to a steering command signal supplied thereto; a sub control unit for producing a second direction control signal according to the steering command signal; and a gate drive control circuit for transmitting the first direction control signal and the torque control signal to the transistors only when the first direction control signal produced by the primary control unit coincides with the second direction control signal produced by the sub control unit. Thereby, the reliability of an electric motor powered steering system can be improved with a simple circuit structure even when the torque control signal consists of an extremely high frequency variable duty ratio signal.

12 Claims, 7 Drawing Sheets

MOTOR DRIVE CONTROL CIRCUIT

TECHNICAL FIELD

The present invention relates to a motor drive control circuit having a high reliability, and in particular to such a motor control circuit which is suitable for use in an electric power steering system.

BACKGROUND OF THE INVENTION

It has been known to detect a steering torque which is applied to the steering wheel and the speed of steering input, and produce a torque assisting the steering operation by carrying out a pulse width modulation (PWM) control of an electric motor attached to the steering system with a control circuit consisting of a CPU. The output end of such a control circuit typically comprises a bridge circuit having a bipolar transistor or a FET on each of its arms. The input terminals of the bridge circuit are connected to a DC power source, and its output terminals are connected to the motor. By activating the transistors located on diagonally opposing arms of the bridge circuit, the motor may be driven in a desired direction. By activating one of the transistors or both the transistors according to a certain duty factor, it is also possible to control the output torque of the motor.

In such a motor control circuit, reliable operation of the CPU is essential for a satisfactory control of the motor. If the CPU becomes unable to produce a proper output due to a hardware failure or a software error, a satisfactory control of the motor becomes impossible. Most of such hardware and software failures can be detected by appropriate use of a watch dog timer circuit and current sensors arranged in appropriate parts of the control circuit, but it is extremely difficult to cover all possible modes of failure with these means alone.

As an alternative approach, it is possible to provide two control circuits in parallel, and carry out a motor control only when the outputs from the control circuit agree with each other. However, since motors are typically controlled by a high frequency pulse signal (typically in 20 kHz or higher range), it is difficult to achieve a necessary synchronism between the two control circuits.

BRIEF SUMMARY OF THE INVENTION

In view of such problems of the prior art, a primary object of the present invention is to provide a motor control circuit based on a PWM process which is highly reliable.

A second object of the present invention is to provide a PWM motor control circuit which is simple in structure.

These and other objects of the present invention can be accomplished by providing: a PWM motor drive control circuit for an electric power steering system, comprising: a bridge circuit having a pair of input terminals which are adapted to be connected to a DC electric power source, a pair of output terminals adapted to be connected to an electric motor, and four arms each defined by a transistor; a main control unit for producing a continual direction control signal for activating a selected one of the transistors, and a torque control signal of a variable duty ratio for activating the transistor diametrically opposed to the selected transistor to activate the electric motor in a desired direction at a desired torque according to a steering command signal supplied thereto; a sub control unit for producing a second direction control signal according to the steering command signal; and a gate drive control circuit for transmitting the first direction control signal and the torque control signal to the diametrically opposed transistors when the first direction control signal produced by the primary control unit coincides with the second direction signal produced by the sub control unit.

Thus, if there is conflict in the command signals from the two control units due to a hardware failure or a software error, no electric current is supplied to the motor, and any undesirable operation of the motor or the driver circuit therefor can be avoided. Since the second control unit is required to produce only a direction control signal which may simply consist of a continual DC signal, the circuit structure of the control system is simplified and the reliability of the system can be improved even when the torque control signal consists of a very high frequency variable duty ratio pulse signal.

According to the present invention, the gate driver control circuit may prevent transmission of the first direction control signal and/or the torque control signal to associated ones of the diametrically opposed transistors when the second direction control signal does not coincide with the first direction control signal and/or the torque control signal. According to a preferred embodiment of the present invention, the gate driver circuit comprises at least a pair of AND circuits each having an output terminal connected to an associated one of the diametrically opposed transistors at the transistor's output terminal and having a first input terminal for receiving the first direction control signal or the torque control signal and a second input terminal for receiving the second direction control signal.

Alternatively, the gate drive control circuit may comprise at least a pair of NOR circuits each having an output terminal connected to an associated one of the diametrically opposed transistors a first input terminal for receiving the first direction control signal, a second input terminal for receiving the torque control signal, and a third input terminal for receiving the second direction control signal.

In order to ensure a stable operation of the system when the torque control signal is in the vicinity of a zero level, it is preferred that the second control circuit unconditionally permits activation of the transistors by the main control unit when a value of the torque control signal is within a certain predetermined range near a zero level. It can be easily accomplished if the sub control unit comprises a pair of comparators each producing a high level output signal or a gate enable signal when the value of the torque control signal is within a certain predetermined range near a zero level.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
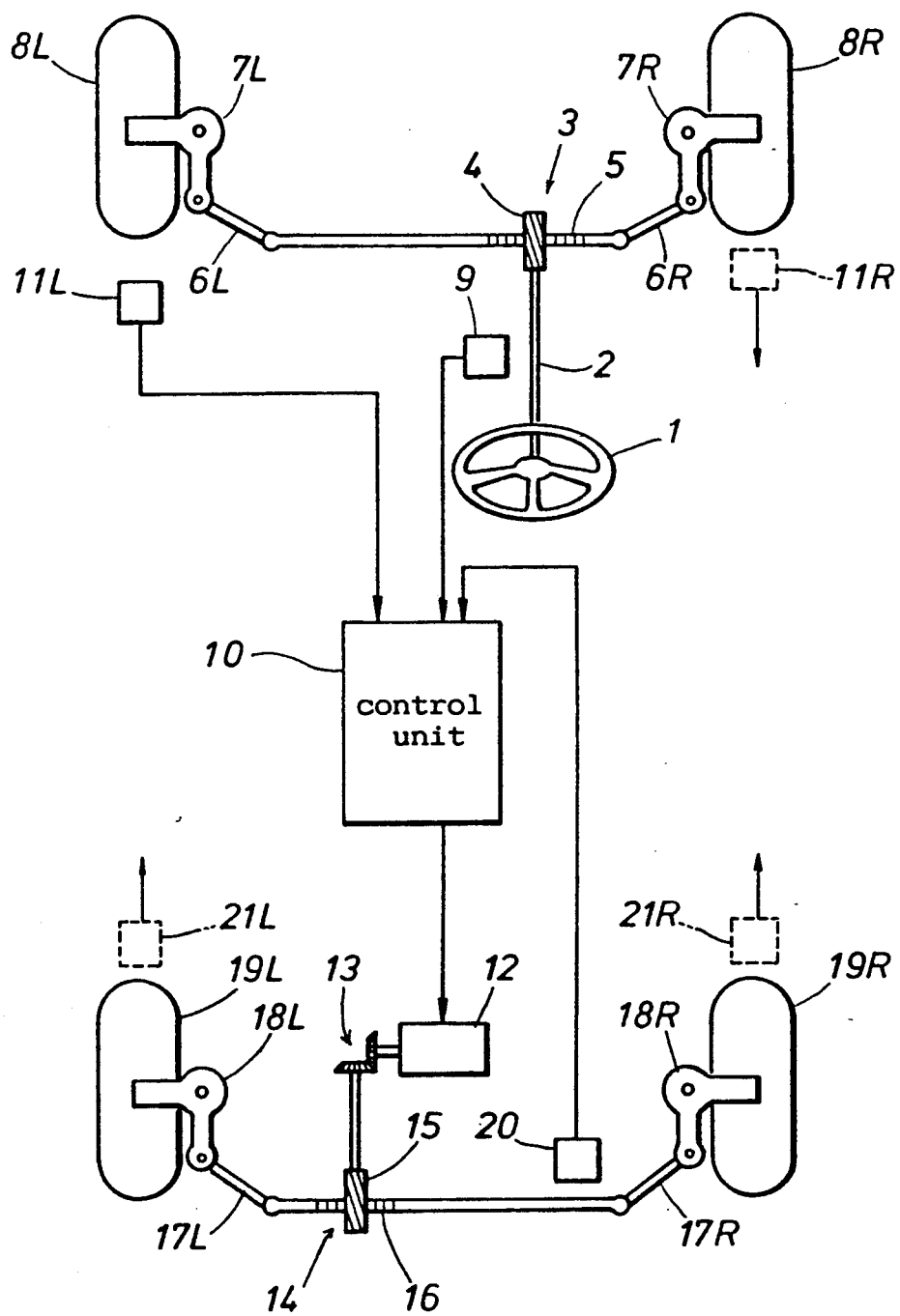
FIG. 1 is a diagram showing an overall structure of a front and rear wheel steering system to which the present invention is applied.

FIG. 1 illustrates the overall structure of a front and rear wheel steering system to which the present invention is applied. A steering wheel 1 is securely attached to an upper end of a steering shaft 2, and is coupled with a front wheel steering gear 3 via this steering shaft 2. The front wheel steering gear 3 consists of a pinion 4, and a rack 5 meshing therewith, and the two ends of the rack 5 are coupled with left and right front wheels 8L and 8R via tie rods 6L and 6R and knuckle arms 7L and 7R, respectively.

The steering shaft 2 is provided with a steering angle sensor 9 consisting of, for instance, a rotary encoder. The output of the steering angle sensor 9 is connected to a control unit 10, and supplies thereto a signal representing an angular position of the steering wheel 1. It is also possible to obtain a steering speed of the steering wheel 1 by differentiating the output from the steering angle sensor 9 either digitally or by an analog differentiation circuit. Each of the front wheels 8L and 8R is provided with a vehicle speed sensor 11L or 11R which supplies a signal representing a vehicle speed to the control unit 10.

An electric motor 12 mounted on a rear end portion of the vehicle, and is controlled by the control unit 10. The output shaft of the electric motor 12 is connected to a rack and pinion type rear wheel steering gear 14 via a conical gear arrangement 13. The rear wheel steering gear 14 consists of a pinion 15 which integrally rotates with the output shaft of the electric motor 12, and a rack 16 meshing therewith. The two ends of the rack 16 are coupled with left and right rear wheels 19L and 19R via tie rods 17L and 17R and knuckle arms 18L and 18R, respectively.

The rack 16 is provided with a rear wheel steering angle sensor 20 for detecting the axial displacement of thereof. The rear wheel steering angle sensor 20 may consist of a differential transformer which receives a AC signal from the control unit 10 to its primary winding and produces a differential signal from its secondary windings in response to the movement of its core. Based upon this differential signal, the control unit 10 can detect the steering angle of the left and right rear wheels 19L and 19R. The left and right rear wheels 19L and 19R are each provided with a vehicle speed sensor 21L or 21R whose output is also connected to the control unit 10.

Figure 2:
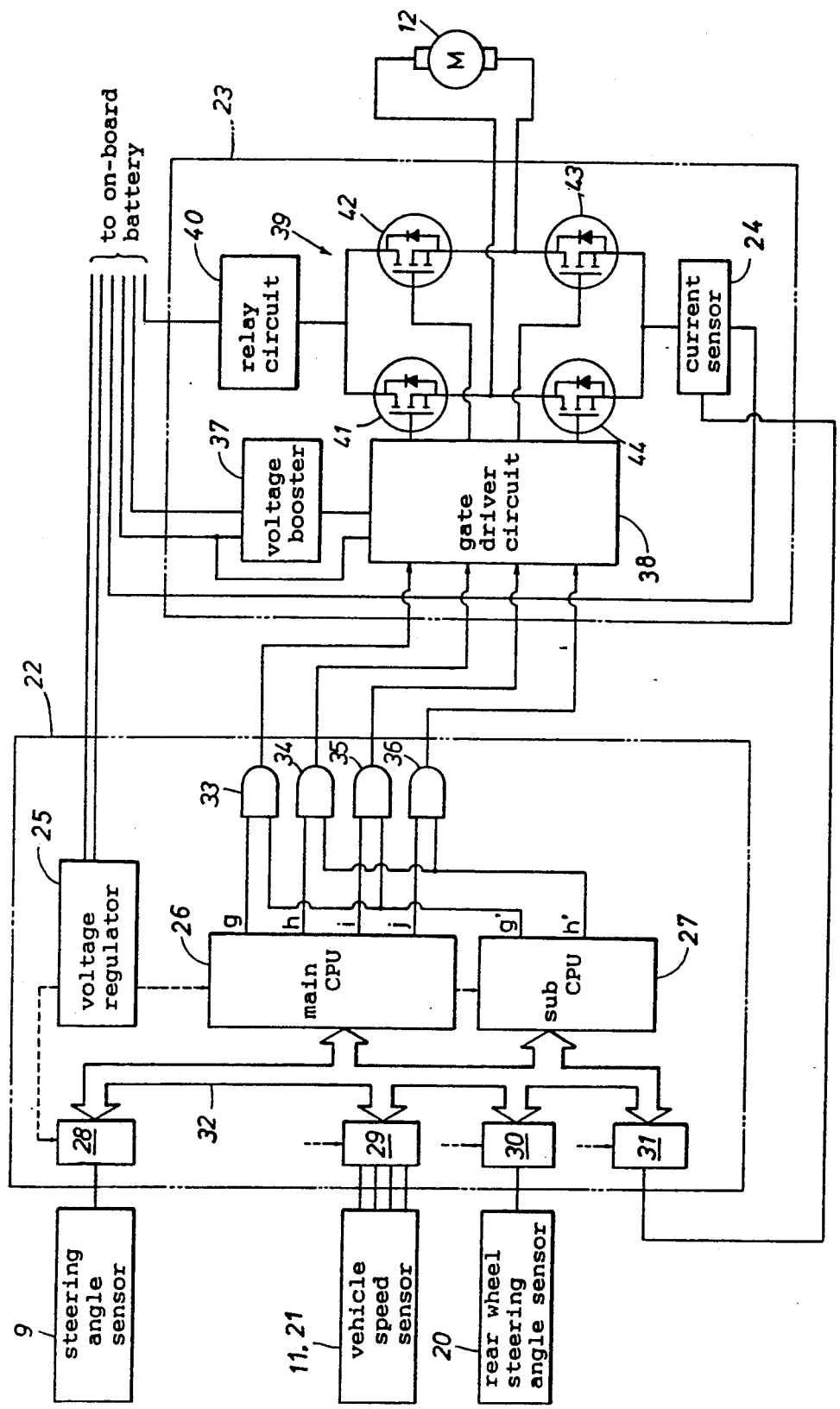
FIG. 2 is a block diagram showing an electric motor drive control circuit which is used in the embodiment illustrated in FIG. 1.

Referring to FIG. 2, the control unit 10 comprises a control circuit 22 which is connected to the steering angle sensor 9, the vehicle speed sensors 11 and 21, and the rear wheel steering angle sensor 20, and a driver circuit 23 which is connected to the electric motor 12. The control circuit 22 is also connected to a current sensor 24 of the driver circuit 23.

The control circuit 22 comprises a voltage regulator circuit 25, a main CPU 26, and an input interface circuit 28 through 31. The voltage regulator 25 is connected to an on-board battery not shown in the drawings via a fuse, and supplies electric power to the various circuits and the CPU's at a constant voltage. The input interface circuits 28 through 31 are connected to the steering angle sensor 9, the vehicle speed sensors 11 and 21, the rear wheel steering angle sensor 20 and the current sensor 24 on the one hand, and are connected to the CPU's 26 and 27 on the other hand.

The input interface circuit 28 processes an input signal from the steering angle sensor 9, and produces a signal representing the steering angle and the steering direction of the front wheels 8L and 8R. The input interface circuit 29 consists of a wave shaping circuit and a digital circuit for converting input signals from the vehicle speed sensors 11 and 21 into a signal presenting the vehicle speed. The input interface circuit 30 consists of an oscillation circuit, a rectifying circuit, and a low-pass filter, and supplies an AC signal to the primary winding of the rear wheel steering angle sensor 20, and rectifies an output signal from the secondary windings of the same. The input interface circuit 31 consists of an amplifier and an AD converter, and converts an input signal from the current sensor 24 into a digital signal.

The main CPU 26 processes signals from the input interface circuits 28 through 31 according to a program stored therein, and controls the direction and the output torque of the electric motor 12 as required by supplying direction signals g and h indicating the direction of the motor drive and pulse width modulated signals (PWM signals) i and j representing the output torque of the electric motor 12 to the driver circuit 23. The output terminals of the CPU 26 producing these signals g, h, i and j are connected to the input terminals of associated AND gates 33 through 36.

The sub CPU 27 likewise processes input signals from the input interface circuits 28 through 31, and determines the direction of the motor drive by the electric motor 12 and produces direction signals g' and h' indicating the direction of the motor drive. The output terminal of the sub CPU 27 producing the direction signal g' is connected to the other input terminals of the AND gates 33 and 35 which are connected to the output terminals of the main CPU 26 producing the direction signal g and the PWM signal i. The output terminal of the sub CPU 27 producing the direction signal h' is connected to the other input terminals of the AND gates 34 and 36 which are connected to the output terminals of the main CPU 26 producing the direction signal h and the PWM signal j.

The driver circuit 23 comprises a voltage booster circuit 37, a gate driver circuit 38, a switching circuit 39, a relay circuit 40 and the aforementioned current sensor 24. The gate driver circuit 38 is connected to the battery via the voltage booster circuit 37, as well as to the output circuits of the AND gates 33 through 36 of the control circuit 22. The switching circuit 39 consists of a bridge circuit of four field effect transistors (FET) 41 through 44, and its input terminal is connected to the battery via the relay circuit 40. The gates of the FET's 41 through 44 are connected to the gate driver circuit 38. The drains of the FET's 41 and 42 are connected to the battery, and their sources are connected to the drains of the FET's 44 and 43, respectively. The sources of the FET's 44 and 43 are grounded via the current sensor 24. The electric motor 12 is connected across the output terminals of the switching circuit 39 or between the node of the source of the FET 41 and the drain of the FET 44 and the node of the source of the FET 42 and the drain of the FET 43.

The voltage booster circuit 37 raises the voltage from the battery and supplies the boosted voltage to the gate driver circuit 38. The gate driver circuit 38 supplies drive signals to the gates of the FET's 41 through 44 of the switching circuit 39 according to the control signals supplied from the AND gates 33 through 36 of the control circuit 22. The current sensor 24 detects the current supplied through the electric motor 12, and supplies an output signal representing the detected current value to the input interface circuit 31.

Figure 3:
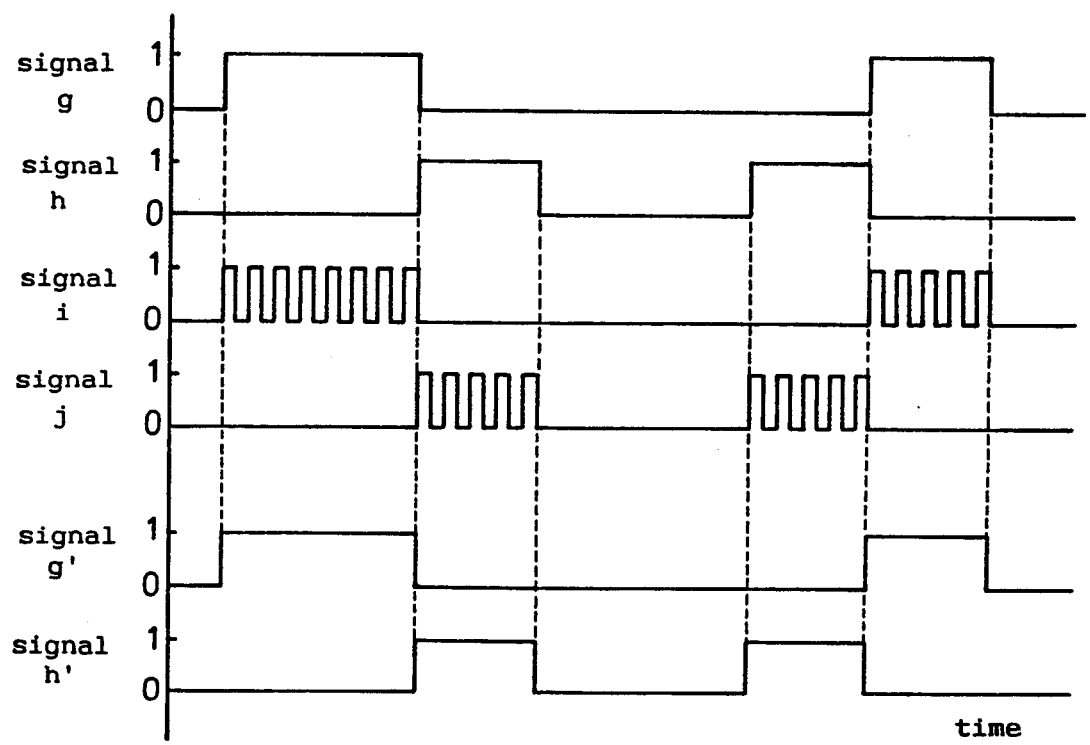
FIG. 3 is a time chart showing the output signals from the main CPU and the sub CPU.

FIG. 3 shows typical output signals of the main CPU 26 and the sub CPU 27. When the direction signal g from the main CPU 26 matches up with the direction signal g' from the sub CPU 27, a direction signal is supplied from the AND gate 33 to the gate driver circuit 38, and the FET 41 is activated continually. When the PWM signal i from the main CPU 26 matches up with the direction signal g' from the sub CPU 27, a PWM signal is supplied from the AND gate 35 to the gate driver circuit 38, and the FET 43 placed diametrically opposite to the FET 41 is activated according to a duty factor corresponding to this signal i. Thus, the electric motor 12 is PWM controlled by these FET's 41 through 44.

On the other hand, when the direction signals g and g' or i and g' from the main CPU 26 and the sub CPU 27 do not match up with each other, since the FET 41 is not activated at all, no current is supplied through the electric motor 12. Therefore, the rear wheels 19L and 19R are not steered when any abnormal condition has occurred, and the reliability of the control of rear wheel steering operation is increased.

When the direction signal h from the main CPU 26 and the direction signal h' from the sub CPU 27 matches up with each other, the FET 42 is activated continually by a direction signal supplied from the AND gate 34 to the gate driver circuit 38. When the PWM signal j from the main CPU 26 and the direction signal h' from the sub CPU 27 match up with each other, the FET 44 located diametrically opposite to the FET 42 is activated according to a duty factor determined by this signal j. When the direction signals h and h' or j and h' from the main CPU 26 and the sub CPU 27 do not match up with each other, since the FET 42 is not activated at all, no current is supplied to the electric motor 12. In this way, it is possible to check the direction of motor drive and timing of the electric motor 12 simply by taking logical products of the direction signals from the two CPU's.

Figure 4A:
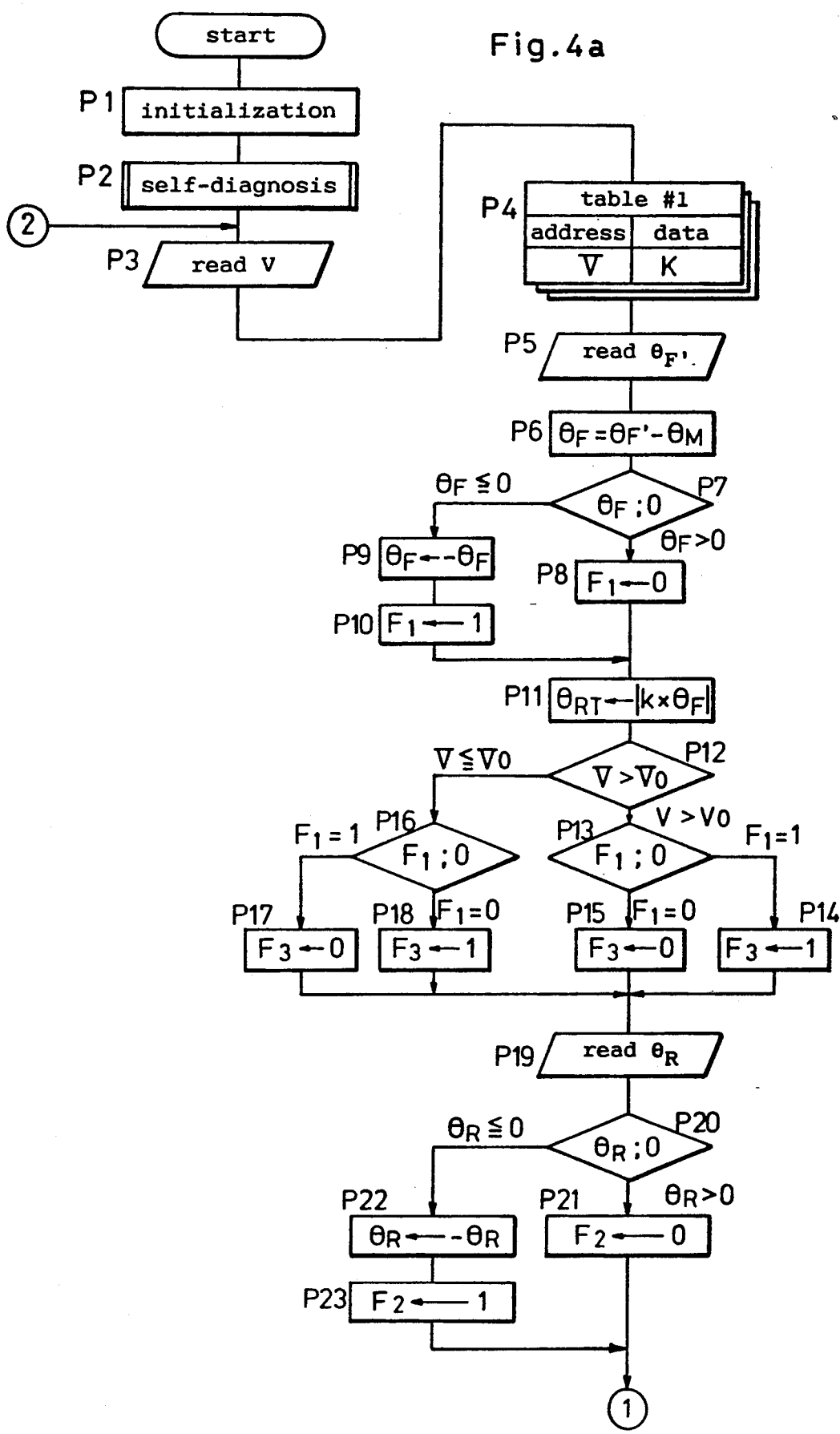
FIGS. 4a and 4b together are a flow the process which is executed by the main CPU.
Figure 4B:
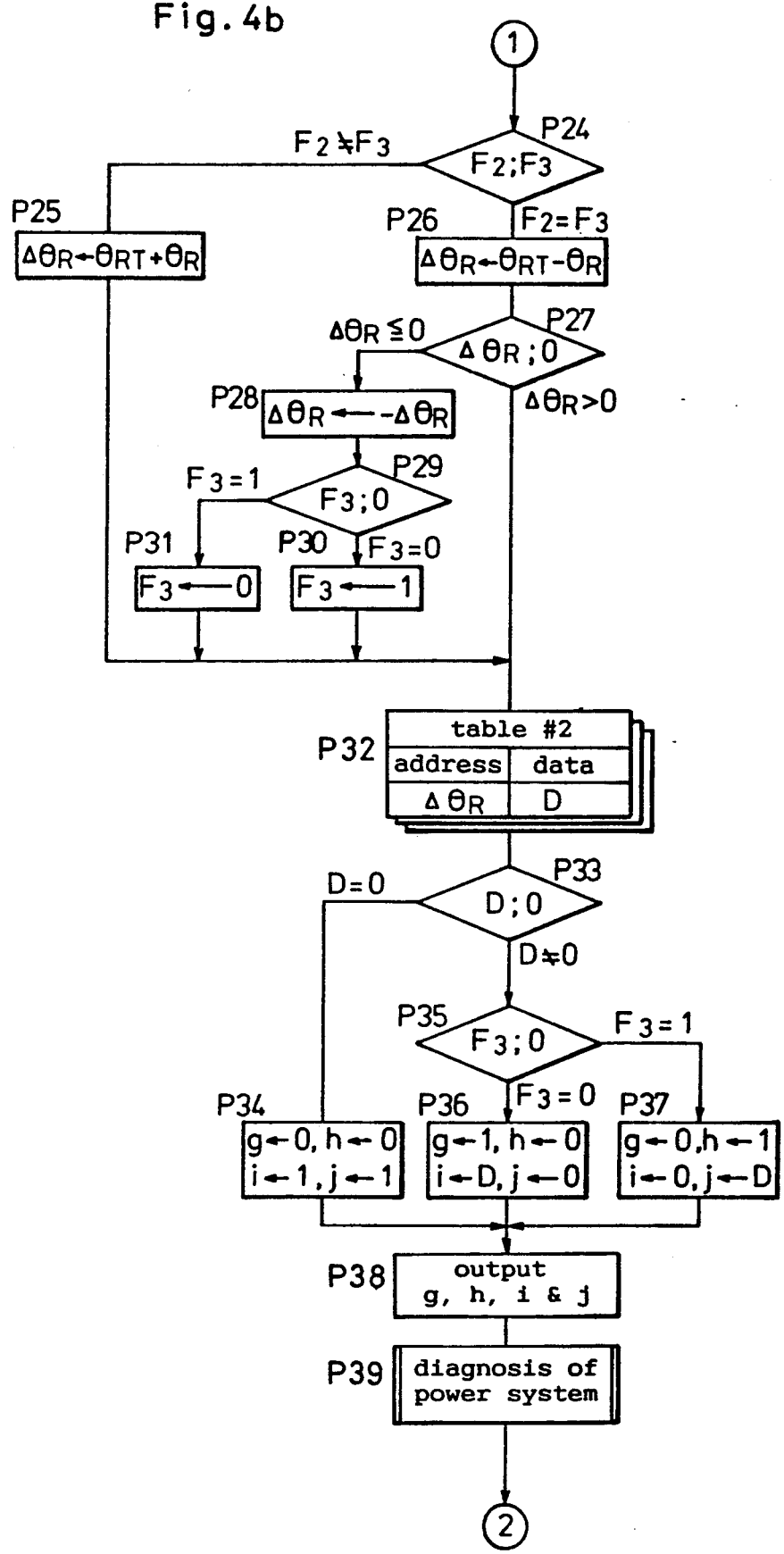

FIGS. 4a and 4b together are a flow chart showing the arithmetic process carried out by the main CPU 26.

First of all, electric power is supplied to the switching circuit 22 and the driver circuit 23 by turning on the ignition switch. In step P1, the main CPU 26 is initialized, and data stored in internal registers of the CPU are erased and address allocation is carried out. In step P2, an initial self-diagnosis is carried out according to a predefined subroutine, and the following process is carried out only when no abnormal condition of the system is detected.

In step P3, a vehicle speed is determined according to output signals from the vehicle speed sensors 11 and 21. In step P4, the steering angle of the rear wheels for a given input angle of the steering wheel 1 or the steering angle ratio k is looked up from a data table #1 as a function of the vehicle speed V. The steering angle ratio k is a negative value indicating a reversed phase relationship when the vehicle speed V is lower than a certain threshold level V1, and takes a positive value indicating a same phase relationship when the vehicle speed is higher than the threshold level V1. In step P5 an output signal $\theta F'$ is obtained from the steering angle sensor 9 and in step P6 a neutral position reference value $\theta M$ is subtracted from the output signal $\theta F'$ to obtain a steering angle $\theta F$ as an angle as measured from a neutral position. This value $\theta F$ is used as an actual steering angle of the front wheels 8L and 8R.

In step P7, the steering direction of the steering wheel 1 is determined according to the sign of the front wheel steering angle $\theta F$. In other words, flag F1 is set to 0 in step P8 when the front wheel steering angle $\theta F$ is positive meaning that the front wheels are steered to the right, and the sign of the front wheel steering angle 8F is reversed in step P9 and the flag F1 is set to 1 in step P10 when the front wheel steering angle $\theta F$ is negative meaning that the front wheels are steered to the left. In step P11, a target steering angle $\theta RT$ of the rear wheels 19L and 19R is determined by taking an absolute value of the front wheel steering angle 8F multiplying it by the steering angle ratio k.

In step P12 it is determined whether the vehicle speed V is higher than a threshold level V0 or not. If the vehicle speed V is higher than this threshold level V0, the value carried by the flag F1 is determined in step P13; A flag F3 is set to 1 in step P14 when the flag F1 carries value "1", and to 0 in step P15 when the flag F1 carries value "0". Likewise, if the vehicle speed V is lower than this threshold level V0, the value carried by the flag F1 is determined in step P16; The flag F3 is set to 0 in step P17 when the flag F1 carries value "1", and to 1 in step P18 when the flag F1 carries value "0".

In step P19 a rear wheel steering angle $\theta R$ is obtained from an output signal of the rear wheel sensor 20. In step P20, the sign of the rear wheel steering angle 8R is determined. A flag F2 is set to 0 in step P21 when the rear wheel steering angle $\theta R$ is positive meaning that the rear wheels are steered to the right, and the value of $\theta R$ is reversed in step P24 and the flag F2 is set to 1 in step P25 when the rear wheel steering angle $\theta R$ is negative meaning that the rear wheels are steered to the left.

In step P24, the values carried by the flags F2 and F3 are compared. If these values disagree, a deviation $\bigcirc \theta R$ is computed by adding the rear wheel steering angle $\theta R$ to the rear wheel target steering angle $\theta RT$ in step P25.

When the values of the flags F1 and F2 agree with each other, a deviation $\bigcirc \theta R$ is computed by subtracting the rear wheel steering angle $\theta R$ from the rear wheel target steering angle $\theta RT$ in step P26, and the sign of the deviation $\bigcirc \theta R$ is determined. The program flow simply advances to step P32 if the deviation $\bigcirc \theta R$ is positive, and the value of the flag F3 is evaluated in step P29 after reversing the sign of the deviation $\bigcirc \theta R$ in step P28 if the deviation $\bigcirc \theta R$ is found to be negative. The flag F3 is set to 1 in step P30 if the flag F3 carries value "0", and the flag F3 is set to 0 in step P31 if the flag F carries value "1".

In step P32, a rear wheel steering force or torque D is looked up from a data table #2 using the deviation $\bigcirc \theta R$ as an address. This steering force D represents the duty factor of the current or the amplitude of the current supplied to the electric motor 12. This data table #2 may have a dead zone around $\bigcirc \theta R = 0$; increase in proportion to the magnitude of the deviation $\bigcirc \theta R$ outside this dead zone, and keep a constant value when the deviation $\bigcirc \theta R$ is larger than a certain limit.

In step P33 it is determined whether the rear wheel steering force D is zero or not. If D is equal to 0, the direction signals g and h and the PWM signals i and j from the main CPU 26 are set to 0, 0, 1 and 1, respectively, in step P34. If D is not equal to zero, the value of the flag F3 is evaluated in step P35. If the flag F3 carries value "0", the signals g, h, i and j are set to 1, 0, D and 0, respectively, in step P36. If the flag F3 carries value "1", the signals g, h, i and j are set to 0, 1, 0 and D, respectively, in step P37. The signals g, h, i and j which are thus set up are outputted in step P38. In step P39, the drive system including the electric motor 12 and the switching circuit 39 are diagnosed according to a predefined subroutine, and the steps P1 through P38 are repeated again.

The sub CPU 27 carries out a similar process. Specifically, the direction signals g' and h' are set to 0 and 0, respectively, when the rear wheels are not to be steered, to 1 and 0, respectively, when the rear wheels are to be steered to the right, and to 0 and 1, respectively, when the rear wheels are to be steered to the left.

Figure 5:
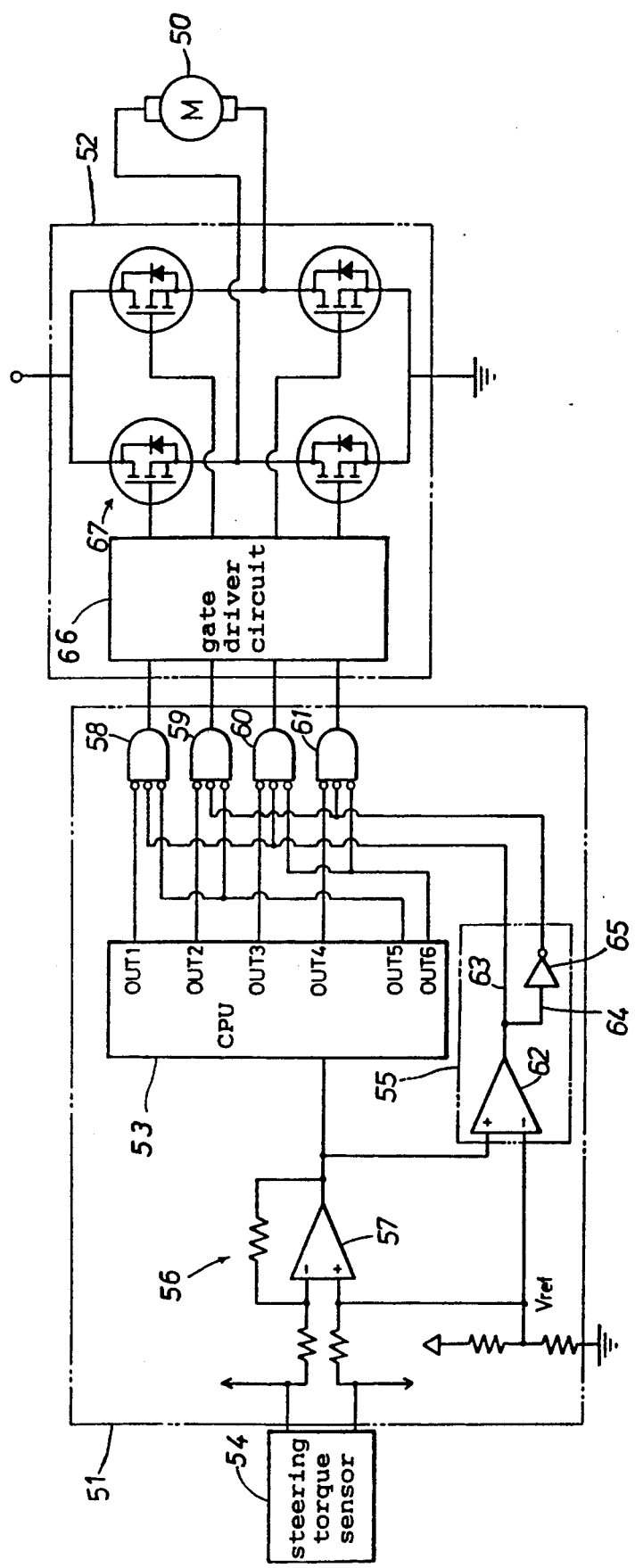
FIG. 5 is a block diagram of a second embodiment of the electric motor drive control circuit according to the present invention.

FIG. 5 illustrates an electric motor drive control unit according to the present invention which is applied to an electric motor powered power steering system in which the steering of the front wheels effected by the manual operation of a steering wheel is assisted by an electric motor 50. This control unit comprises a control circuit 51 which is connected to a vehicle speed sensor, a steering angle sensor mounted on a steering shaft, and a steering torque sensor for detecting a steering torque, and a driver circuit 52 which is connected to the electric motor 50.

The control circuit 51 comprises a CPU 53 which determines the direction and torque of the motor drive by the electric motor 50 according to the inputs from the various sensors, and a direction detecting circuit 55 for detecting the direction of the motor drive by the electric motor 50. The steering torque sensor 54 is mounted on the steering shaft which transmits power from the electric motor 50 to the front wheel, and comprises a differential transformer consisting of primary winding which receives an AC signal and a pair of secondary windings which produce a differential signal corresponding to the deformation of the steering rod, and a rectifying circuit. The steering torque sensor 54 is connected to the CPU 53 via a differential amplifier 56 comprising an operation amplifier 57.

The CPU 53 determines the direction and torque of the motor drive of the electric motor 50 according to the signals supplied from the various sensors. The CPU 53 has output terminals OUT1 through OUT4 which are connected to respective NOR gates 58 through 61 and supply on-off signals for controlling four FET's defining a switching circuit for the driver circuit 52 as described hereinafter. The CPU 53 further has an output terminal OUT5 which is commonly connected to third inputs of the NOR gates 58 and 59, and an output terminal OUT6 which is commonly connected to third inputs of the NOR gates 60 and 61, to supply PWM signals to the associated NOR gates to PWM control the motor 50 in both cases. It is obvious to a person skilled in the art that the NOR gates 58 through 61 may be replaced by AND gates with suitable modifications of the circuit structure or the phase relationship of the input signals to the gates, and each NOR gate may consist of a plurality of logic gates to carry out a necessary logical manipulation.

The drive direction detecting circuit 55 comprises a comparator 62 having a non-inverting input connected to the output terminal of the differential amplifier 56 and an inverting input which is connected to a reference voltage Vref. The motor drive direction detecting circuit 55 produces a direction signal according to the direction of the drive of the electric motor 50 as detected from the output of the steering torque sensor 54. The output of the comparator 62 is also connected to the third input terminals of the NOR gate 58 and 60 via a signal line 63, and to the third input terminals of the NOR gate 59 and 61 via a NOT gate 65 and a signal line 64.

The driver circuit 52 comprises a gate driver circuit 66 and a switching circuit 67 in a similar manner as the embodiment illustrated in FIG. 2. The switching circuit 67 consists of a bridge circuit having four FET's, and its input terminals are connected to a power source while its output terminals are connected to the electric motor 50. The gates of the FET's are connected to the outputs of the NOR gates 58 through 61 via the gate driver circuit 66.

When the direction signals and the PWM signals produced from the CPU 53 match up with the direction signals produced from the drive direction detecting circuit, selected ones of the FET's of the switching circuit 67 are activated according to the direction signals and the PWM signals which are supplied from the associated NOR gates 58 through 61 to the gate drive circuit 66. Thus, the electric motor 50 is PWM controlled.

On the other hand, when the output signals from the CPU 53 do not match up with the outputs from the drive direction detecting circuit 55 with each other, as no direction signal or PWM signal is produced from any of the NOR gates, none of the FET's in the switching circuit 67 is activated, and the electric motor 50 is not activated. In this way, faulty operation of the electric motor 50 due to a failure of the CPU 53 can be avoided. A failure of the CPU 53 could occur not only because of defects in its hardware but also because of abnormal operation of its software due to spurious noises and other reasons.

In the embodiment illustrated in FIG. 5, the direction of the drive of the electric motor 50 is detected by the output of the comparator 62 which compares the output of the differential amplifier 56 with a reference voltage Vref. However, this reference voltage Vref may fluctuate because of noises. Therefore, it is preferred to provide a dead zone in the drive direction detecting circuit 55 on either side of the reference voltage Vref, and unconditionally produces an output to activate the FET's in the switching circuit 67 when the output from the differential amplifier 56 falls within this region, and selectively produce an output which is indicative of the drive direction of the electric motor 50 when the output from the differential amplifier 56 does not fall within this region.

Figure 6:
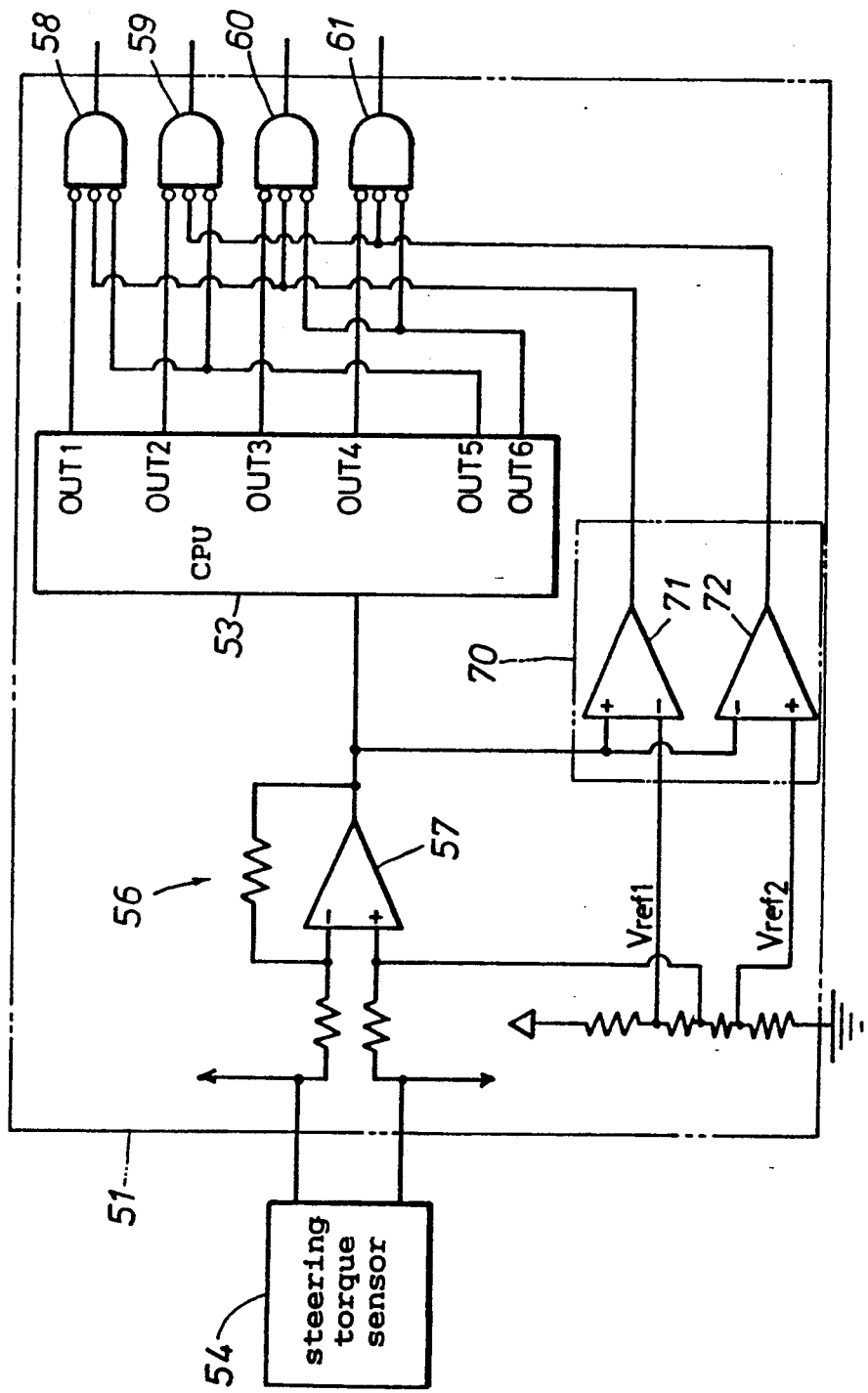
FIG. 6 is a block diagram of an essential part of a third embodiment of the electric motor drive control circuit according to the present invention.

FIGS. 6 shows such a modification from the embodiment illustrated in FIG. 5. According to this embodiment, the drive direction detection circuit 70 comprises a pair of comparators 71 and 72. One of the comparators 71 has a non-inverting input which is connected to the output terminal of the differential amplifier 56 and an inverting input which is connected to a first reference voltage Vref1. The other comparator 72 has an inverting input which is connected to the output terminal of the differential amplifier 56 and a non-inverting input which is connected to a second reference voltage Vref2. The output of the comparator 71 is connected to the third input terminals of the NOR gates 58 and 60 while the output of the comparator 72 is connected to the third inputs of the NOR gates 59 and 61.

The first and second reference voltages are selected in such a manner that the relationship Vref1 > Vref > Vref2 holds and a dead zone may be defined on either side of the reference voltage Vref. The comparator 71 produces a high output when the output of the differential amplifier 58 is higher than the first reference voltage Vref1, and otherwise produces a low output. The comparator 72 produces a high output when the output of the differential amplifier 56 is lower than the second reference voltage Vref2, and otherwise produces a low output. When the output of the differential amplifier 56 is lower than the first reference voltage Vref1 but higher than the second reference voltage Vref2, the comparators 71 and 72 produce low outputs and all the FET's of the switching circuit 67 are activated. By thus constructing the drive direction detection circuit so as to provide a dead zone in the vicinity of the reference voltage Vref, any fluctuations or unevenness in the operation of the CPU 53 can be avoided. Further, an electromagnetic braking force can be obtained when no torque is being produced from the electric motor 50. Alternatively, a hysteresis may be used instead of a dead zone.

Thus, the present invention can improve the reliability of an electric motor powered steering system by providing a sub CPU or a motor drive direction detecting circuit in addition to a main CPU which controls the direction and torque of the motor drive of the powered steering system according to a manual input to a steering wheel, and activating the electric motor only when the outputs from the two CPU's or outputs from the motor drive direction detection circuit and the main CPU match up with each other.

Although the present invention has been described by way of example with reference to the accompanying drawings, it is apparent to those skilled in the art that various changes and modifications can be made thereto without departing from the spirit of the present invention.

What we claim is:

1. A PWM motor drive control circuit for an electric power steering system, comprising:
    a bridge circuit having a pair of input terminals which are adapted to be connected to a DC electric power source, a pair of output terminals adapted to be connected to an electric motor, and four arms each defined by a transistor;
    a main control unit for producing a first continual direction control signal for activating a selected one of said transistors, and a torque control signal of a variable duty ratio for activating the transistor diametrically opposed to said selected transistor to activate said electric motor in a desired direction at a desired torque according to a steering command signal supplied thereto;
    a sub control unit for exclusively producing a second direction control signal according to said steering command signal; and
    a gate drive control circuit for transmitting said first direction control signal and said torque control signal to said diametrically opposed transistors only when said first direction control signal produced by said primary control unit coincides with said second direction signal produced by said sub control unit.

2. A PWM motor drive control circuit according to claim 1, wherein said gate drive control circuit prevents transmission of at least one of said first direction control signal and said torque control signal to associated ones of said diametrically opposed transistors when said first direction control signal does not coincide with said second direction control signal.

3. A PWM motor drive control circuit according to claim 2, wherein said gate drive control circuit comprises at least a pair of gate circuits each having an output terminal connected to an associated one of said diametrically opposed transistors, a first input terminal for receiving said first direction control signal and a second input terminal for receiving said second direction control signal.

4. A PWM motor drive control circuit according to claim 1, wherein said gate drive control circuit prevents transmission of at least one of said first direction control signal and said torque control signal to associated ones of said diametrically opposed transistors when said torque control signal does not coincide with said second direction control signal.

5. A PWM motor drive control circuit according to claim 4, wherein said gate drive control circuit comprises at least a pair gate circuit each having an output terminal connected to an associated one of said diametrically opposed transistors, a first input terminal for receiving said torque control signal and a second input terminal for receiving said second direction control signal.

6. A PWM motor drive control circuit according to claim 1, wherein said gate drive control circuit permits transmission of said first direction control signal and said torque control signal to associated ones of said diametrically opposed transistors only when both said first direction control signal and said torque control signal produced by said primary control unit coincide with said second direction signal produced by said sub control unit.

7. A PWM motor drive control circuit according to claim 6, wherein said gate drive control circuit comprises at least a pair of gate circuits each having an output terminal connected to an associated one of said diametrically opposed transistors, a first input terminal for receiving said first direction control signal, a second input terminal for receiving said torque control signal, and a third input terminal for receiving said second direction control signal.

8. A PWM motor drive control circuit according to claim 7, wherein said sub control unit unconditionally permits activation of said diametrically opposed transistors by said main control unit when a value of said torque control signal is within a certain predetermined range near a zero level;
    said sub control unit comprises a pair of comparators each producing an enable signal when the value of said torque control signal is within a certain predetermine range near a zero level.

9. A PWM motor drive control circuit according to claim 7, wherein said sub control unit unconditionally permits activation of said diametrically opposed transistors by said main control unit when a value of said torque control signal is within a certain predetermined range near a zero level.

10. A PWM motor drive control circuit according to claim 1, wherein said four transistors consist of field effect transistors.

11. A PWM motor drive control circuit according to claim 1, wherein said steering command signal comprises an output from a sensor for detecting a manual input torque to a steering wheel.

12. A PWM motor drive control circuit for an electric power steering system, comprising:

- a bridge circuit having a pair of input terminals which are adapted to be connected to a DC electric power source, a pair of output terminals adapted to be connected to an electric motor, and four arms each defined by a transistor;
- a main control unit for producing a first continual direction control signal for activating a selected one of said transistors, and a torque control signal of a variable duty ratio for activating the transistor diametrically opposed to said selected transistor to activate said electric motor in a desired direction at a desired torque according to a steering command signal supplied thereto;
- a sub control unit for exclusively producing, as the only outputs thereof, at least one second direction control signal according to said steering command signal; and
- a gate drive control circuit for transmitting said first direction control signal and said torque control signal to said diametrically opposed transistors only when said first direction control signal produced by said primary control unit coincides with said second direction signal produced by said sub control unit.

* * * * *

UNITED STATES PATENT AND TRADEMARK OFFICE
CERTIFICATE OF CORRECTION

PATENT NO. : 5,202,830
DATED : April 13, 1993
INVENTOR(S) : Tsurumiya et al.

It is certified that error appears in the above-identified patent and that said Letters Patent is hereby corrected as shown below:

Column 2, line 5, after "sistors" insert --only--;
Column 2, line 39, change "transistors" to --transistors,--;
Column 2, line 67, after "flow" insert --chart showing--.

Column 6, line 15, change "8F" to --θF--;
Column 6, line 21, change "8F" to --θF--;
Column 6, line 36, chagne "8R" to --0R--.

Column 10, line 64 (claim 9, line 2), change "7" to --1--.

Signed and Sealed this

Seventh Day of December, 1993

Attest:

BRUCE LEHMAN

*Attesting Officer*  Commissioner of Patents and Trademarks